United States Patent
Ho et al.

(10) Patent No.: US 9,008,620 B2
(45) Date of Patent: Apr. 14, 2015

(54) MOBILE DEVICE SERVICE AUTHORIZATION SYSTEM AND METHOD

(75) Inventors: Edwin Ho, Palo Alto, CA (US); King Sun Wai, Castro Valley, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1631 days.

(21) Appl. No.: 11/490,266

(22) Filed: Jul. 19, 2006

(65) Prior Publication Data

US 2008/0020738 A1 Jan. 24, 2008

(51) Int. Cl.
| | |
|---|---|
| H04W 12/06 | (2009.01) |
| H04L 29/06 | (2006.01) |
| H04W 12/08 | (2009.01) |
| H04W 4/00 | (2009.01) |
| H04W 8/26 | (2009.01) |

(52) U.S. Cl.
CPC .......... *H04L 63/18* (2013.01); *H04L 63/10* (2013.01); *H04W 4/00* (2013.01); *H04W 8/26* (2013.01); *H04W 12/08* (2013.01)

(58) Field of Classification Search
USPC .......... 455/414.3, 410–411, 414.1, 436, 444; 370/338, 352, 331; 705/65, 26
See application file for complete search history.

(56) References Cited

U.S. PATENT DOCUMENTS

| | | | |
|---|---|---|---|
| 5,689,100 A | 11/1997 | Carrithers et al. | |
| 5,734,838 A | 3/1998 | Robinson et al. | |
| 5,795,225 A | 8/1998 | Jones et al. | |
| 6,463,534 B1 * | 10/2002 | Geiger et al. | 713/168 |
| 6,571,289 B1 * | 5/2003 | Montenegro | 709/227 |
| 6,618,592 B1 * | 9/2003 | Vilander et al. | 455/452.1 |
| 6,795,701 B1 * | 9/2004 | Baker et al. | 455/411 |
| 6,891,811 B1 | 5/2005 | Smith et al. | |
| 6,965,868 B1 * | 11/2005 | Bednarek | 705/9 |
| 7,142,840 B1 * | 11/2006 | Geddes et al. | 455/411 |
| 7,355,990 B2 | 4/2008 | Smith et al. | |
| 7,426,202 B2 * | 9/2008 | Warrier et al. | 370/338 |
| 7,447,183 B1 * | 11/2008 | Leung | 370/338 |
| 7,565,168 B2 * | 7/2009 | Andaker et al. | 455/560 |
| 7,779,250 B2 * | 8/2010 | Song et al. | 713/156 |
| 8,046,012 B2 * | 10/2011 | Sweeney | 455/466 |
| 8,527,770 B2 * | 9/2013 | Brown et al. | 713/175 |
| 2002/0197979 A1 * | 12/2002 | Vanderveen | 455/410 |
| 2004/0127217 A1 * | 7/2004 | Aoki et al. | 455/435.1 |
| 2004/0172531 A1 * | 9/2004 | Little et al. | 713/155 |
| 2004/0220997 A1 * | 11/2004 | De Saint-Johns | 709/201 |
| 2005/0210264 A1 * | 9/2005 | Vesikivi et al. | 713/185 |
| 2005/0255886 A1 * | 11/2005 | Aaltonen et al. | 455/558 |
| 2006/0002556 A1 * | 1/2006 | Paul | 380/270 |
| 2006/0165060 A1 * | 7/2006 | Dua | 370/352 |
| 2006/0287004 A1 * | 12/2006 | Fuqua | 455/558 |
| 2007/0101415 A1 * | 5/2007 | Masui | 726/5 |

(Continued)

OTHER PUBLICATIONS

International Search Report and Written Opinion dated Jan. 24, 2008 for International Application No. PCT/US2007/016452 from United States Patent and Trademark Office, filed Jul. 19, 2007, pp. 1-11, United States.

(Continued)

*Primary Examiner* — Khawar Iqbal
(74) *Attorney, Agent, or Firm* — Sherman IP LLP; Kenneth L. Sherman; Hemavathy Perumal

(57) ABSTRACT

A system and method for mobile device service authorization is provided in which the service is authorized with limited user actions. The mobile device service authorization system uses to separate links to perform the service authorization.

18 Claims, 3 Drawing Sheets

(56) References Cited

U.S. PATENT DOCUMENTS

2007/0142039 A1* 6/2007 Bushnell et al. ........... 455/414.1
2010/0024024 A1* 1/2010 Siourthas et al. ................. 726/9
2010/0029253 A1* 2/2010 Han et al. ................... 455/414.2

OTHER PUBLICATIONS

International Preliminary Report on Patentability and Written Opinion dated Jan. 20, 2009 for International Application No. PCT/US2009/016452 from International Bureau of WIPO, pp. 1-7, Geneva, Switzerland.

* cited by examiner

MOBILE DEVICE SERVICE AUTHORIZATION SYSTEM AND METHOD

FIELD OF THE INVENTION

The invention relates generally to a system and method for authorizing a service for a mobile device.

BACKGROUND OF THE INVENTION

Cellular phones and other mobile devices that provide telephone service are ubiquitous. The sales of wireless telephone service has become a commodity so that mobile device operators and networks are looking for a way to provide other services to the mobile device and generate revenue from those services. The other services include games, music, videos. In order to be able to provide these services to the user, systems must permit a user to sign up for the service and become an authorized service user. In most current mobile device authorization systems, the user authorization process requires a user action in order to complete the authorization process. As a result, some users will not sign up for the service due to the requirement of a user action. Therefore, it is desirable to provide a mobile device service authorization system that overcomes this limitation with the current systems and it is to this end that the present invention is directed.

SUMMARY OF THE INVENTION

A mobile device service authorization system and method are provided in which the authorization process is completed with minimal user actions. The authorization system makes the authorization process easier for a user so that the user is more likely to sign up for the service. The system uses a first link and a second link to complete the authorization process wherein the first link may be an IP network and the second link may be an SMS network.

In accordance with the invention, a system for authorizing a service for a mobile device is provided wherein the system comprises a mobile device that requests a mobile device service over a link wherein the request includes a unique identifier of the mobile device and a phone number of the mobile device. The system also has an authorization unit coupled to the mobile device by the link that can authorize the request of the mobile device service. In the system, the authorization unit stores a unique token that is associated with the unique identifier of the mobile device and communicates the unique token to the mobile device over a different link than the mobile device request. The mobile device further comprises an application that receives the unique token and returns the unique token to the authorization unit without user action in order to authorize the mobile device service.

In accordance with another aspect of the invention, a method for authorizing a mobile device service is provided. During the method, a request for a service is received from a mobile device wherein the request includes a unique identifier of the mobile device and a phone number of the mobile device. A storage unit of the authorization system then stores a unique token for the mobile device request wherein the unique token is associated with unique identifier of the mobile device. The authorization unit then sends a message containing the unique token to the mobile device using the phone number of the mobile device. The mobile device then communicates the unique token back to the authorization unit and the service for the mobile device is authorized when the communicated unique token matches the unique token stored in the storage unit.

DETAILED DESCRIPTION OF A PREFERRED EMBODIMENT

The invention is particularly applicable to a mobile device service authorization system used with a mobile device service system shown in FIG. 1 and it is in this context that the invention will be described. It will be appreciated, however, that the mobile device service authorization system and method in accordance with the invention has greater utility since the mobile device service authorization system and method may be used with other mobile device systems.

Figure 1:
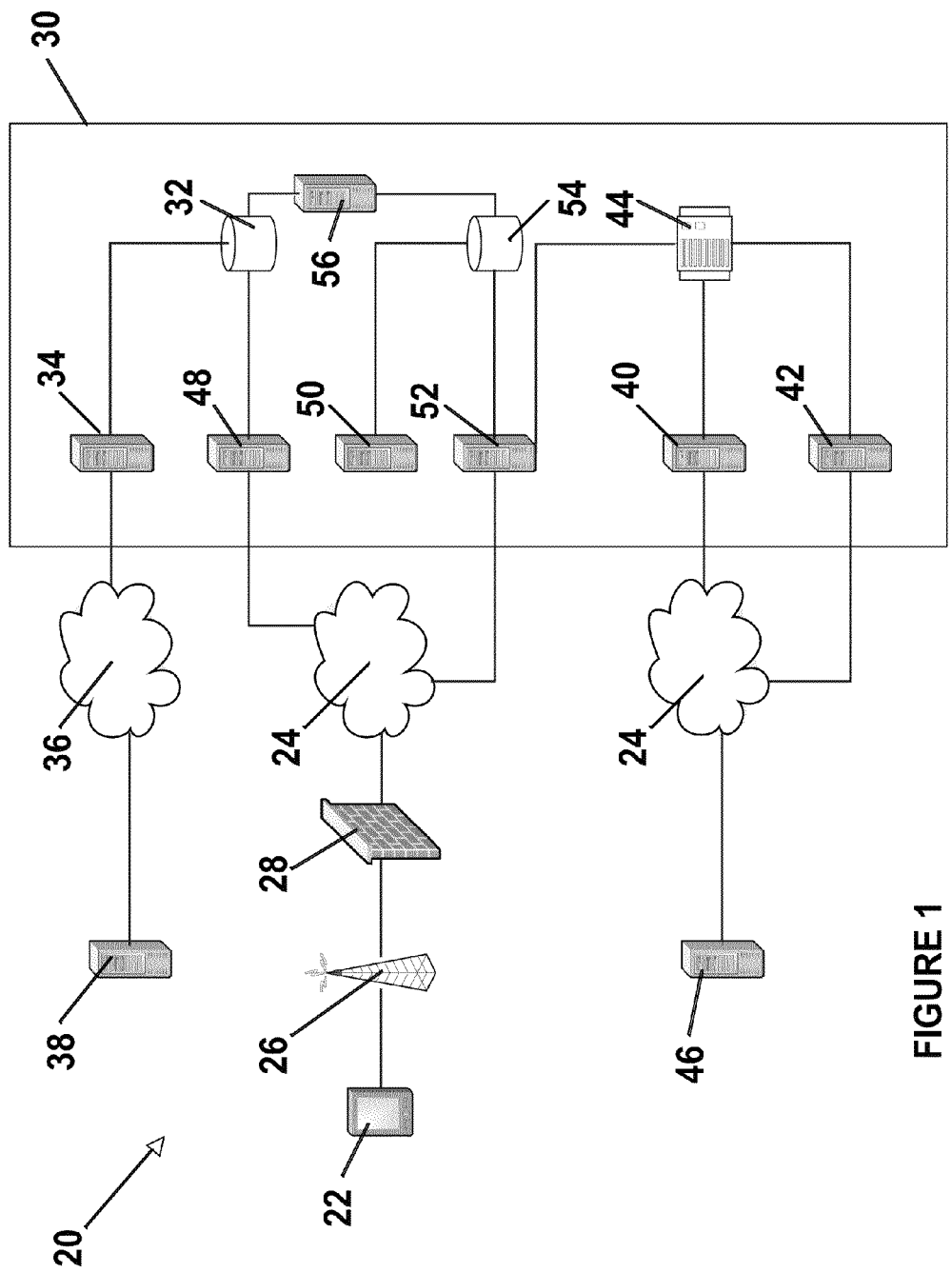
FIG. 1 is a block diagram of a mobile device service system that may include the mobile device service authorization method.

FIG. 1 is a block diagram of a mobile device service system 20 that may include the mobile device service authorization method. The mobile device service system provides one or more services, such as movies, videos, television, audio feeds, sports information, music, etc. to a mobile device 22 that includes a client application, such as a JAVA piece of code, that processes the incoming service data and displays the service data to the user of the mobile device. The client application is executed by the processing unit of the mobile device. The client application may include a client service application portion that has a plurality of lines of code executed by the processor of the mobile device that perform the service authorization method described below. The client service application portion is programmed to listen to a particular network port, such as an SMS port. The client service application portion may then perform the steps of the authorization method set forth below. The system 20 may provide a television content delivery service (in which television shows are delivered to the mobile device), radio content delivery service (in which radio shows/feeds are delivered to the mobile device), a sports information delivery service (in which live textual or image sports information is delivered to the mobile device), a video delivery service (in which videos or movies are delivered to the mobile device) and a music delivery service (in which music content is delivered to the mobile device). The mobile device 22 may be any processing unit-based device with sufficient processing power, memory, display and connectivity capabilities to execute the client application, send/receive messages over the SS7 network, receive the service data and display that service data. For example, the mobile device may be a PDA, laptop computer, mobile phone, wireless email device, such as the Blackberry, or an Internet appliance. In the example shown in FIG. 1, the mobile device 22 couples to the system 20 over a communications link 24, such as the Internet, over a wireless network 26 and a firewall 28. The mobile device service system 20 has a service unit 30 that performs various function and operations for the mobile device service system.

The service unit 30 may include a user information storage unit 32 that stores information about each user of the mobile device service system including user billing information, user authorized service(s) and user service personalization information. The service unit 30 may also have a billing unit 34, that may be a server computer, that performs a billing operation for the services provided to the user. In the example shown in FIG. 1, the billing for the services are communicated over a secure link 36, such as an secure socket layer (SSL) connection, to a carrier billing system 38 so that the mobile device carrier can provide the bill for the services on the monthly invoice of the user of the mobile device. Alternatively, the service unit 30 can directly bill the user. The service unit 30 may also include a live content ingester 40, a clip digester 42 and a content/asset storage unit 44, that may be a database server, that handle the service content from a third party 46 that will be delivered by the mobile device service system. The live content ingester receives any live content, such as a live video feed or live sporting information, and processes it and then stores the live content in the content/asset storage unit 44 in various output encoding and file formats. The clip digester 42 receives non-live content and data, processes it and then stores the clips in the storage unit 44 in various output encoding and file formats.

The service unit 30 may further include a menu/personalization unit 48, a reporting unit 50, a streaming unit 52, a log storage unit 54, such as a database server, and a data mining unit 56. The menu/personalization unit 48, the reporting unit 50, the streaming unit 52 and the data mining unit 56 may preferably each be server computers. The menu/personalization unit generates and delivers the mobile device service user interfaces to the user that may also be customized by the user based on the customization information stored in the user information storage unit 32. The streaming unit may preferably support the real-time streaming protocol (RTSP) and the hypertext transfer protocol (HTTP) and may deliver/stream the service content to the mobile device over the link 24. The streaming unit may request the service content from the content store 44 and may store service content information in the log store 54. The reporting unit 50 may generate a report about various aspects of the service unit and its operations. The data mining unit 56 collects user behavior information and then mines the behavior information to determine any recommendations and personalizations for users of the system. Now, a method for mobile device service authorization in accordance with the invention will be described in more detail.

Figure 2:
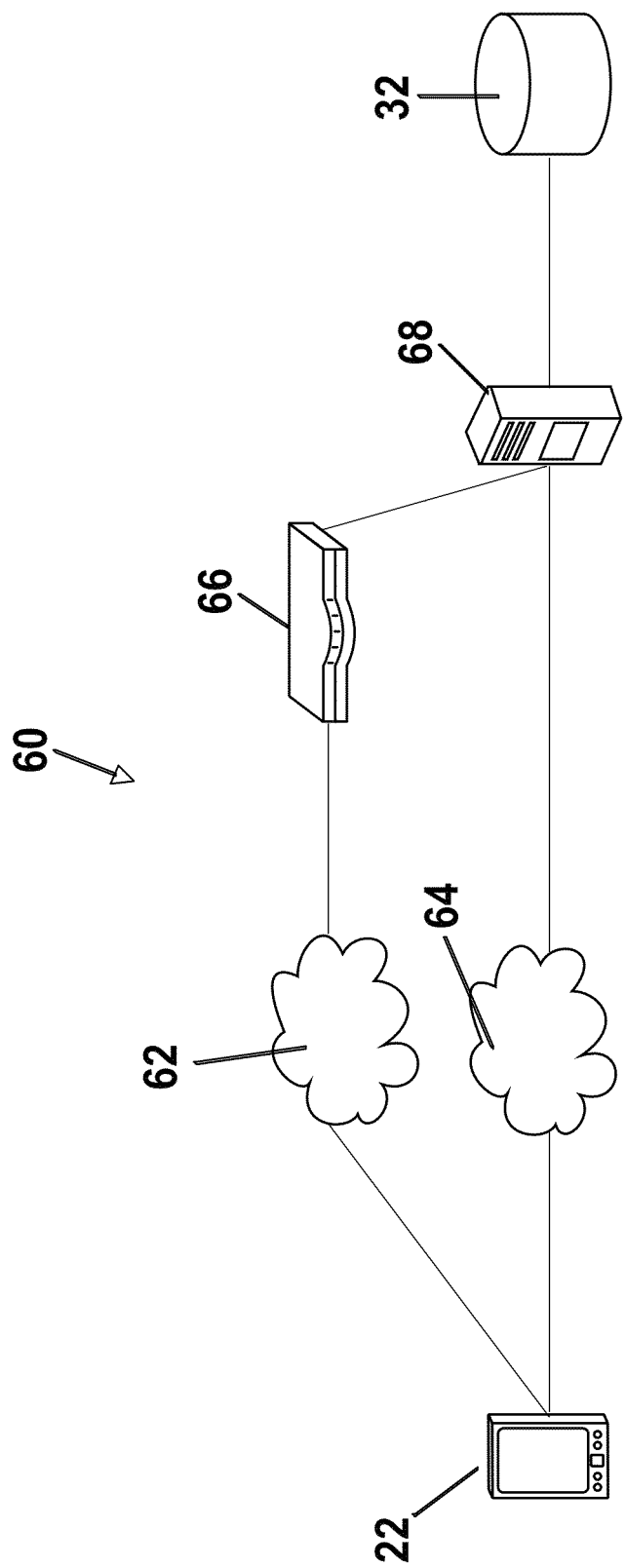
FIG. 2 illustrates an example of a mobile device service authorization system in accordance with the invention.

FIG. 2 illustrates an example of a mobile device service authorization system 60. In order to authorize a user for a particular service, the authorization system may use a first link 62 and a second link 64 in combination with each other. The first link 62 may preferably be an SS7 link and the second link 64 may preferably be the IP link that is an IP network. The first link 62 may be coupled to a gateway 66, such as a short message system (SMS) gateway, which is then coupled to an authorization unit 68 that may preferably be a server computer. The authorization unit 68 may then be coupled to the user data storage unit 32 to perform the authorization and indicate that the user is then authorized for the particular service. During the mobile device service authorization method, messages are communicated between the mobile device 22 and the authorization unit 68 over the first and second links 62, 64 as described below.

Figure 3:
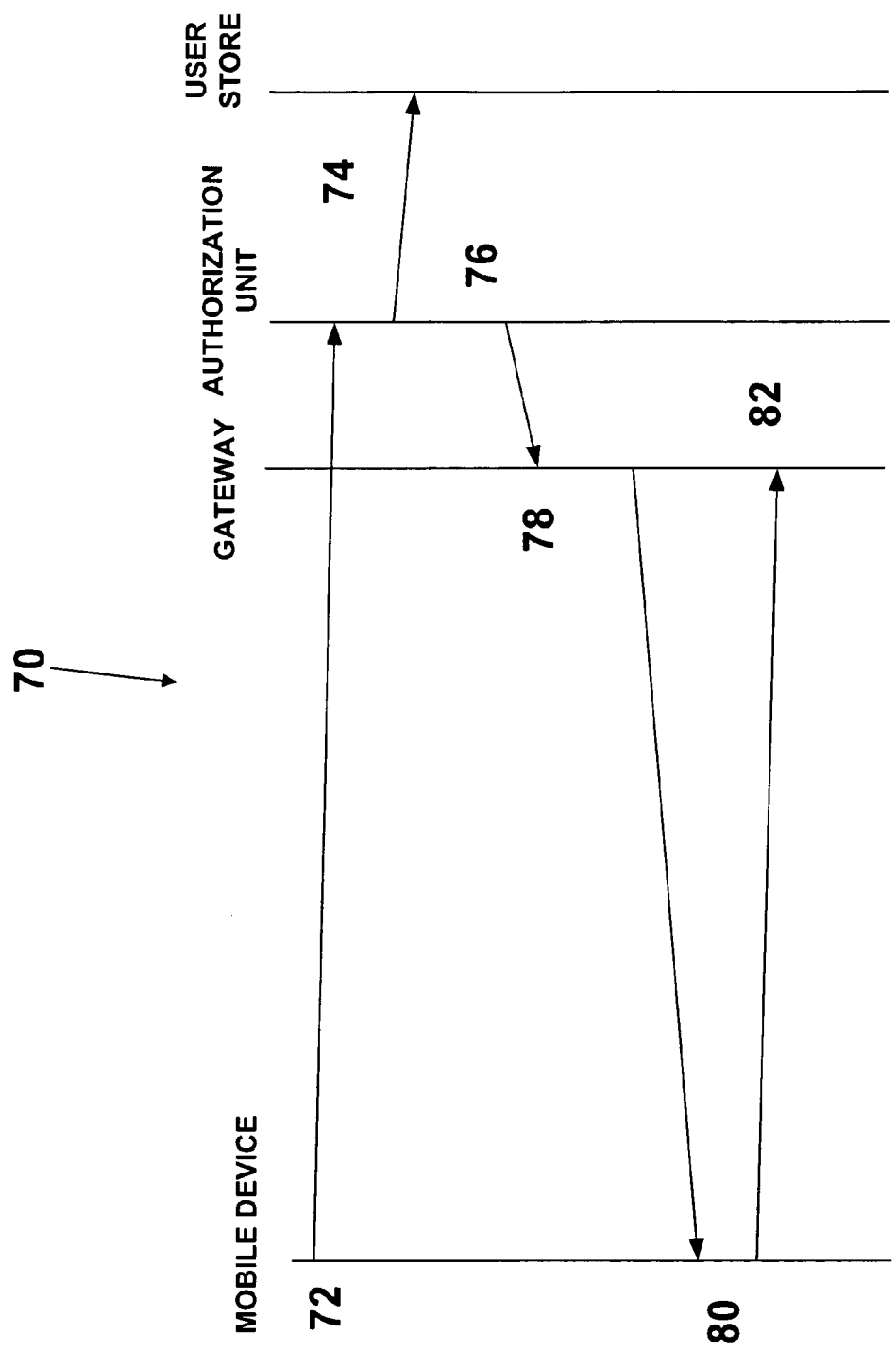
FIG. 3 illustrates an example of a mobile device service authorization method in accordance with the invention.

FIG. 3 illustrates an example of a mobile device service authorization method 70 in accordance with the invention. In step 72, the user of the mobile device may register for an SMS alert service by sending the telephone number of the mobile device to the mobile device service system and in particular the authorization unit. The request from the mobile device is sent over the IP link 64. When the mobile device sends that request, the request has a unique mobile device identifier, such as the IP address of the mobile device, associated with the request so that the authorization unit 68 can uniquely identify the particular mobile device. In step 74, the authorization unit 68 (in coordination with the user storage unit 32) generates a unique token for the user request and stores that unique token in the user data unit 32 wherein the token is associated with the unique mobile device identifier. In step 76, once the unique token for the particular user is generated and stored in the user store, the authorization unit 68 generates and sends a message, such as an SMS message, with the unique token to the phone number contained in the user request. In step 78, the message is communicated over the first link 62 to the mobile device using the phone number in the request. The message over the first link is used to allow the system to validate the phone number/address of the mobile device and allow the client service application to determine the address/phone number of the mobile device since the client service application is not generally able to determine the phone number of the mobile device. In step 80, the client service application of the mobile device receives the inbound message (because the client service application portion is listening to the assigned port), decodes the message and then sends the unique token back to the second link 64. Thus, the user does not need to take any action in order to complete the authorization process. The above step 80 can occur when the client service application portion is currently running on the mobile device. An alternative to this step when the client service application is not currently running is that the inbound message generates a request for an explicit user action to complete the authorization such as clicking on a link to send back the token or a mobile device dialog to the user (generated by the mobile device operating system) for starting the client service application (based on the receipt of the inbound message on a particular port) so that the client service application can complete the service authorization as described above. Another alternative to this step is that the message generates a text message to the user of the mobile device with directions (or a link) to complete the service authorization. In step 82, the authorization unit 68 compares the received token to the token stored in the user store 32 and, if the received token matches the stored token, the user is validated and authorized to use the service.

As an alternative to the method shown in FIG. 3, the mobile device service authorization can be implemented using several other methods that are within the scope of the invention. In a first alternative method, the mobile device may send the request message over the second link (IP network) and the authorization unit sends the token back to the mobile device over the same network. The mobile device may then send the token back to the authorization server over the first link (preferably the SS7 network) to validate the mobile device and its phone number so that the authorization is fully automatic. In this alternative method, the user of the mobile device is charged for the SMS message whereas the user is not charged for the SMS message in the first method described above.

Another alternative to the method shown in FIG. 3 is an authorization method in which the mobile device generates a message over the first link (the SS7 network) that is sent over that first link back to the phone and the client service application so that the client service application is able to determine the phone number/address of the mobile device. Once the client service application has determined the address/phone number, that information is sent to the authorization unit over the second link (IP network) in order to authorize the service request for the particular mobile device. In this alternative method, the user of the mobile device is charged for two SMS messages (one sent message and one received message).

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system for authorizing a service for a mobile device, comprising:
an authorization unit, coupled to the mobile device, configured to authorize a request of the mobile device for a mobile device service over a first link, wherein the request in a single message includes both a phone number of the mobile device and an Internet Protocol (IP) address of the mobile device, and wherein the authorization unit stores a unique token that is associated with the IP address of the mobile device and communicates, over a second link that is different from the first link, a message including the unique token to the mobile device using the phone number of the mobile device; and
an application resident on the mobile device, wherein the application is configured to: receive the message; determine the phone number of the mobile device based on the message received;
and
return the unique token to the authorization unit without user action in order to authorize the mobile device service.

2. The system of claim 1, wherein the mobile device service further comprises one of a television content delivery service, radio content delivery service, a sports information delivery service, a video delivery service and a music delivery service.

3. The system of claim 1 wherein:
the first link further comprises a first type of network; and
the second link further comprises a second type of network.

4. The system of claim 3, wherein the first type of network is an IP network and the second type of network is a short message system network having a gateway.

5. The system of claim 1, wherein the authorization unit further comprises a server computer that executes an authorization application.

6. The system of claim 1, wherein:
the application is further configured to:
listen to an assigned port;
receive the message via an assigned port; and
decode the message received to obtain the unique token.

7. The system of claim 6, wherein the mobile device further comprises one of a processing unit-based device with sufficient processing power, memory, display and connectivity capabilities to execute the application and receives messages over the first link, wherein the mobile device further comprises one of a personal digital assistant device, a laptop computer, a mobile phone, a wireless email device and an Internet appliance.

8. The system of claim 1, wherein:
the authorization unit generates the unique token that is associated with the IP address of the mobile device.

9. The system of claim 1, wherein:
upon receiving the unique token from the authorization unit over the second link, the application returns the unique token to the authorization unit over the first link without user action.

10. The system of claim 1, wherein:
the authorization unit validates the phone number of the mobile device and authorizes the mobile device service if the unique token returned by the application matches the unique token stored by the authorization unit.

11. A method for authorizing a service for a mobile device, the method comprising:
receiving a request for a service from the mobile device, wherein the request in a single message includes both a phone number of the mobile device and an Internet Protocol (IP) address of the mobile device;
storing a unique token in a storage unit for the mobile device, wherein the unique token is associated with the IP address of the mobile device;
sending, via an authorization unit, a message containing the unique token to the mobile device using the phone number of the mobile device;
communicating, from the mobile device, the unique token back to the authorization unit without user action; and
authorizing the service for the mobile device when the communicated unique token matches the unique token stored in the storage unit;
wherein an application resident on the mobile device is configured to receive the message from the authorization unit and determine the phone number of the mobile device based on the message received.

12. The method of claim 11, wherein the service further comprises one of a radio content delivery service, a sports information delivery service, a video delivery service and a music delivery service.

13. The method of claim 11, wherein the application is further configured to:
listen to an assigned port;
receive the message via an assigned port; and
decode the message received to obtain the unique token.

14. The method of claim 13, wherein:
receiving the request for the service further comprises receiving the request for the service over a first type of network; and
sending the message further comprises sending the message over a second type of network.

15. The method of claim 14, wherein the first type of network is an IP network and the second type of network is a short message system network having a gateway.

16. The method of claim 11, wherein:
the authorization unit generates and stores the unique token that is associated with the IP address of the mobile device.

17. The method of claim 11, wherein:
the mobile device communicates the unique token back to the authorization unit without user action when the mobile device receives the unique token from the authorization unit.

18. The method of claim 11, wherein:
the authorization unit validates the phone number of the mobile device and authorizes the service when the communicated unique token matches the unique token stored in the storage unit.

* * * * *